US012497946B2

(12) United States Patent
Damgaard et al.

(10) Patent No.: US 12,497,946 B2
(45) Date of Patent: Dec. 16, 2025

(54) SERVICE BRAKE FOR A WIND TURBINE YAW MOTOR

(71) Applicant: Siemens Gamesa Renewable Energy A/S, Brande (DK)

(72) Inventors: Steen Damgaard, Herning (DK); Helge Fogh, Billum (DK); Rune Nielsen, Ikast (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/579,880

(22) PCT Filed: Jul. 7, 2022

(86) PCT No.: PCT/EP2022/068828
§ 371 (c)(1),
(2) Date: Jan. 17, 2024

(87) PCT Pub. No.: WO2023/001564
PCT Pub. Date: Jan. 26, 2023

(65) Prior Publication Data
US 2024/0337246 A1 Oct. 10, 2024

(30) Foreign Application Priority Data

Jul. 23, 2021 (EP) .................... 21187330

(51) Int. Cl.
*F03D 7/02* (2006.01)
*F03D 80/50* (2016.01)
*F16D 125/64* (2012.01)

(52) U.S. Cl.
CPC ......... *F03D 7/0248* (2013.01); *F03D 7/0204* (2013.01); *F03D 80/50* (2016.05);
(Continued)

(58) Field of Classification Search
CPC ...... F03D 7/0248; F03D 7/0204; F03D 80/50; F03D 7/0208; F03D 7/0244;
(Continued)

(56) References Cited

U.S. PATENT DOCUMENTS 2,153,523 A * 4/1939 Edmonds ............... H02K 7/183
416/DIG. 4
2,214,807 A * 9/1940 Buckley ............... H02K 7/1023
477/23
(Continued)

FOREIGN PATENT DOCUMENTS

CN 103 785 989 B 5/2016
CN 108825433 A * 11/2018 ............... F03D 7/00
(Continued)

OTHER PUBLICATIONS

International Search Report and Written Opinion for PCT/EP2022/068828, mailed on Oct. 10, 2022.

*Primary Examiner* — Nathaniel E Wiehe
*Assistant Examiner* — Art Golik
(74) *Attorney, Agent, or Firm* — Schmeiser, Olsen & Watts LLP

(57) ABSTRACT

A service brake for a wind turbine yaw motor brake is provided, the service brake including a brake housing comprising a brake housing cavity extending axially, in direction of a central axis, through the length of the brake housing. A brake disc is included within the brake housing, being rotatable about the central axis in an airgap between friction plates. A lever is connected to the brake housing, and, when engaged, is configured to close at least part of the airgap and bring the friction plates in frictional contact with the brake disc. A removable centerpiece is insertable within the brake housing cavity, the centerpiece includes a brake disc interface configured to engage with the brake disc and a shaft interface configured to engage with a shaft to be braked. The
(Continued)

centerpiece is configurable to transfer braking torque from the brake disc to the shaft to be braked.

19 Claims, 7 Drawing Sheets

(52) U.S. Cl.
CPC ........ *F03D 7/0244* (2013.01); *F05B 2230/80* (2013.01); *F05B 2260/90* (2013.01); *F05B 2260/902* (2013.01); *F16D 2125/64* (2013.01)

(58) Field of Classification Search
CPC ................ F03D 80/505; F03D 80/507; F05B 2260/902; F05B 2260/90; F05B 2230/80; F16D 55/2255; F16D 2125/64; Y10T 29/49718–4975
See application file for complete search history.

(56) References Cited

U.S. PATENT DOCUMENTS

| | | | | |
|---|---|---|---|---|
| 3,633,714 A | * | 1/1972 | Klaue | ................... F16D 65/853 188/161 |
| 8,550,769 B2 | * | 10/2013 | Behnke | ................... F03D 80/00 415/908 |
| 2010/0038192 A1 | * | 2/2010 | Culbertson | ........... F03D 7/0244 188/73.31 |
| 2013/0088009 A1 | * | 4/2013 | Cousineau | ........... F03D 7/0204 290/44 |
| 2014/0131149 A1 | * | 5/2014 | Chang | ..................... F16D 65/18 188/73.31 |
| 2017/0067519 A1 | * | 3/2017 | Woods | ..................... F03D 1/06 |
| 2018/0320661 A1 | * | 11/2018 | Hinken | ................. F16D 55/025 |
| 2020/0191124 A1 | * | 6/2020 | Nunez Polo | ........... F03D 80/70 |
| 2021/0199089 A1 | * | 7/2021 | Kodama | ............ F03D 7/0248 |

FOREIGN PATENT DOCUMENTS

| | | | | |
|---|---|---|---|---|
| CN | 106545600 B | * | 3/2019 | |
| CN | 209 380 646 U | | 9/2019 | |
| CN | 110425093 A | * | 11/2019 | ............ F03D 80/00 |
| EP | 3 139 058 A1 | | 3/2017 | |
| EP | 3412907 A1 | * | 12/2018 | .......... F03D 7/0204 |
| EP | 3 412 907 B1 | | 1/2021 | |
| KR | 101571445 B1 | * | 4/2015 | |
| WO | WO-2013040606 A1 | * | 3/2013 | ........... F16D 65/128 |

* cited by examiner

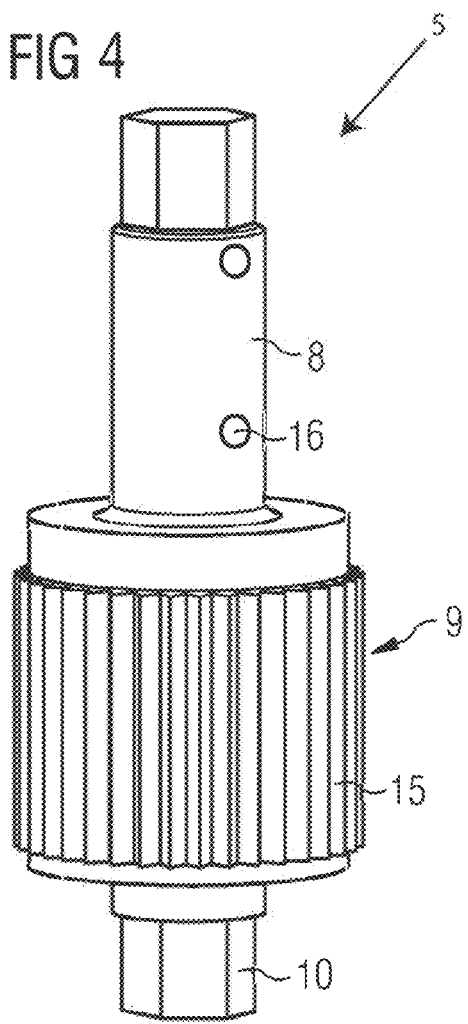

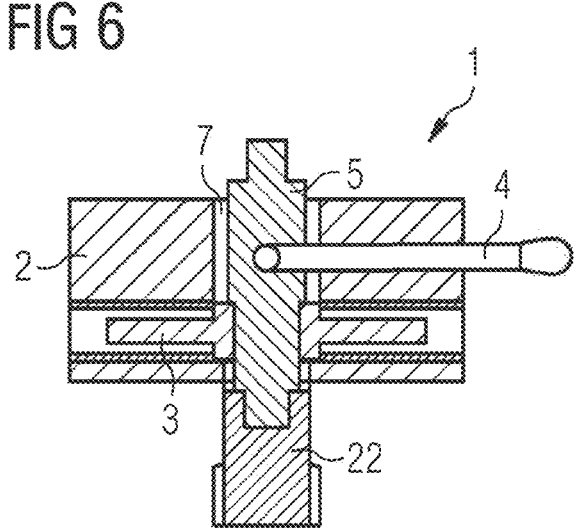

SERVICE BRAKE FOR A WIND TURBINE YAW MOTOR

CROSS-REFERENCE TO RELATED APPLICATIONS

This application claims priority to PCT Application No. PCT/EP2022/068828, having a filing date of Jul. 7, 2022, which claims priority to European Application No. 21187330.2, having a filing date of Jul. 23, 2021, the entire contents both of which are hereby incorporated by reference.

FIELD OF TECHNOLOGY

The following lies in the field of service brakes for wind turbine yaw drives. The following relates to a service brake device for a wind turbine yaw motor brake and a corresponding method for applying a service brake to a wind turbine yaw motor brake.

BACKGROUND

In the above-described technical field service brakes are used in a yaw drive system of a modern wind turbine. Wind turbines are complex electro-mechanical systems used to generate electricity from wind energy and to supply the generated electricity into an electrical grid. A single wind turbine normally comprises a tower onto which a nacelle and rotor are mounted. The rotor comprises normally a hub and a plurality of blades. The nacelle normally houses components including a frequency converter, a generator, optionally a gearbox, a transformer and a yaw drive system.

Purpose of the yaw drive system is to rotate the nacelle and the rotor, around a tower axis and into the wind, which enables maximum energy extraction from the wind if the rotor axis, by activating the yaw drive system, will be oriented substantially in the direction of the incoming wind. The yaw drive system may also be used to rotate the nacelle and the rotor out of the prevailing wind direction in case of extreme wind speeds and therefore relieve the loads experienced by the wind turbine. The yaw drive system normally comprises a plurality of yaw drives. The yaw drive normally comprises a yaw motor, a yaw motor brake and a yaw drive gearbox with a pinion that may engage with an annular gear fixed either to the nacelle or to the tower. Via a yaw bearing the nacelle can be rotated around the tower axis.

Traditionally, the yaw drive system of a wind turbine may utilize hydraulic disc brakes with a plurality of brake calipers to maintain the desired nacelle position. Additionally, the wind turbine yaw motor brakes may be used to supplement the hydraulic disc brakes and further fix the nacelle position. In the recent wind turbine designs it may be possible to omit the hydraulic disc brakes completely from the wind turbine yaw drive system. In this case, only brakes that are used to maintain the desired nacelle position are the wind turbine yaw motor brakes. This design change is enabled by the increased number of yaw drives in the yaw drive system of wind turbines and increased braking capacity in consequence.

The main technical problem arising from the new wind turbine design with omitted hydraulic brakes, is insufficient braking capacity that may result from the worn-out wind turbine yaw motor brakes. This specific situation may occur, for example, in case of extreme wind events, where the kinetic energy of the wind surpasses the braking capacity of the wind turbine yaw motor brakes and, as a result, the nacelle slides away from the desired nacelle position. During this nacelle sliding event, the wind turbine yaw motor brakes may be worn-out to a degree where they do not provide sufficient braking capacity. Servicing the worn-out yaw motor brakes may then be necessary by service technicians.

Service procedure of the worn-out yaw motor brakes must be performed in a safe manner where any potential danger to service technicians must be minimized. Standard service brakes known in the conventional art might not provide sufficient level of safety because the standard service brake installation may coincide with a potential rotation of the yaw motor shaft. If the standard service brake was activated, it could be propelled from its mounting place and bring an injury to service technicians. Therefore, safety improvement in service brakes is desired.

SUMMARY

An aspect relates to a service brake for a wind turbine yaw motor brake, the service brake comprising a brake housing mountable vertically atop the wind turbine yaw motor brake, the brake housing furthermore comprising a brake housing cavity extending axially, in direction of a central axis (a), through the length of the brake housing. Additionally, a brake disc is comprised within the brake housing, the brake disc being rotatable about the central axis (a) in an airgap, between at least two friction plates. A manipulation device, for example embodied as a lever, is connected to the brake housing, the lever, when engaged, is configured to close at least part of the airgap and bring the friction plate(s) in frictional contact with the brake disc. A, removable, centerpiece is arranged, is insertable, within the brake housing cavity along the central axis (a). The centerpiece may comprise a brake disc interface configured to engage with the brake disc and a shaft interface configured to engage with a shaft to be braked. The centerpiece is therefore configurable to transfer braking torque from the brake disc to the shaft to be braked.

The safety improvement feature of the service brake according to embodiments of the invention, over conventional service brake, reflects in decoupling of the shaft to be braked and the brake disc by the centerpiece. During the mounting of the service brake according to embodiments of the invention, a dangerous possibility that a service technician mounts the activated service brake on the yaw motor brake with the potentially spinning shaft to be braked, is avoided.

In an embodiment, the brake housing may be cylindrical in shape. In an embodiment, this allows to match a shape of the wind turbine yaw motor brake, e.g., for avoiding sharp edges. Additionally, cylindrical shape of the brake housing provides for space-saving in a limited space such as the nacelle.

In another embodiment brake housing may comprise fastening means, bolts, for securing the brake housing to the wind turbine yaw motor brake. This allows stable and reliable connection of the service brake and the wind turbine yaw motor brake.

In an embodiment the brake disc may comprise a central opening with a grooved surface. This enables to have a surface which could be mated with a corresponding opposite surface of another component to transfer torque to the brake disc.

The brake disc interface is an externally grooved spline shaft. A first groove pattern of the spline shaft may correspond to a second groove pattern of the surface of the central opening, such that the spline shaft is receivable by the brake disc by engaging the first groove pattern of the spline shaft with the second groove pattern of the surface of the central opening.

Alternatively, the brake disc interface may have a polygonal cross-sectional profile, a sextant cross-sectional profile.

The shaft interface may have a polygonal cross-sectional profile which, in an embodiment is a sextant profile.

The centerpiece of the service brake may comprise a handle for manual insertion of the centerpiece into the brake housing cavity and/or for removal of the centerpiece from the brake housing cavity. The handle may comprise a radial hole for securing the centerpiece on an external support member.

Embodiments of the invention are further directed to a method for applying the service brake, as defined in the previous sections, on a wind turbine yaw motor brake. Steps of mounting the service brake atop the wind turbine yaw motor brake and inserting the centerpiece in the brake housing cavity are comprised in the method. The centerpiece engages with the brake disc by the brake disc interface and engages with the shaft to be braked with the shaft interface. In embodiments, the method comprises a step of engaging the lever in order to close at least part of the airgap and bring the friction plates in frictional contact with the brake disc, thereby transferring braking torque from the brake disc to the shaft to be braked.

Additionally, embodiments of the invention are directed to a method for locking a wind turbine yaw drive system comprising a plurality of wind turbine yaw motor brakes. In embodiments, the method comprises steps of:
- mounting a plurality of service brakes, wherein each brake of the plurality of service brakes is designed according to the previous paragraphs, atop the plurality of wind turbine yaw motor brakes;
- inserting the respective centerpiece of each service brake of the plurality of service brakes in the respective brake housing cavity of the plurality of service brakes and
- engaging the respective lever of each service brake of the plurality of service brakes. Number of the service brakes mounted may be equal to the number the wind turbine yaw motor brakes or may be less than the number of the wind turbine yaw motor brakes.

Finally, embodiments of the invention are directed to a method for servicing a wind turbine component, comprising the steps of:
- locking the wind turbine yaw drive system according to previously described method for the plurality of service brakes,
- performing a service operation on the wind component, the wind turbine component being a further wind turbine yaw motor brake.

Embodiments of the invention are described in more detail hereinafter with reference to examples of embodiments but to which the invention is not limited.

It has to be noted that embodiments of the invention have been described with reference to different subject matters. In particular, some embodiments have been described with reference to apparatus type claims whereas other embodiments have been described with reference to method type claims. However, a person skilled in the conventional art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION

Some of the embodiments will be described in detail, with references to the following Figures, wherein like designations denote like members, wherein:

FIG. 4 shows a removable centerpiece with main components;

FIG. 6 shows the service brake with the lever in engaged position;

Figure 7:
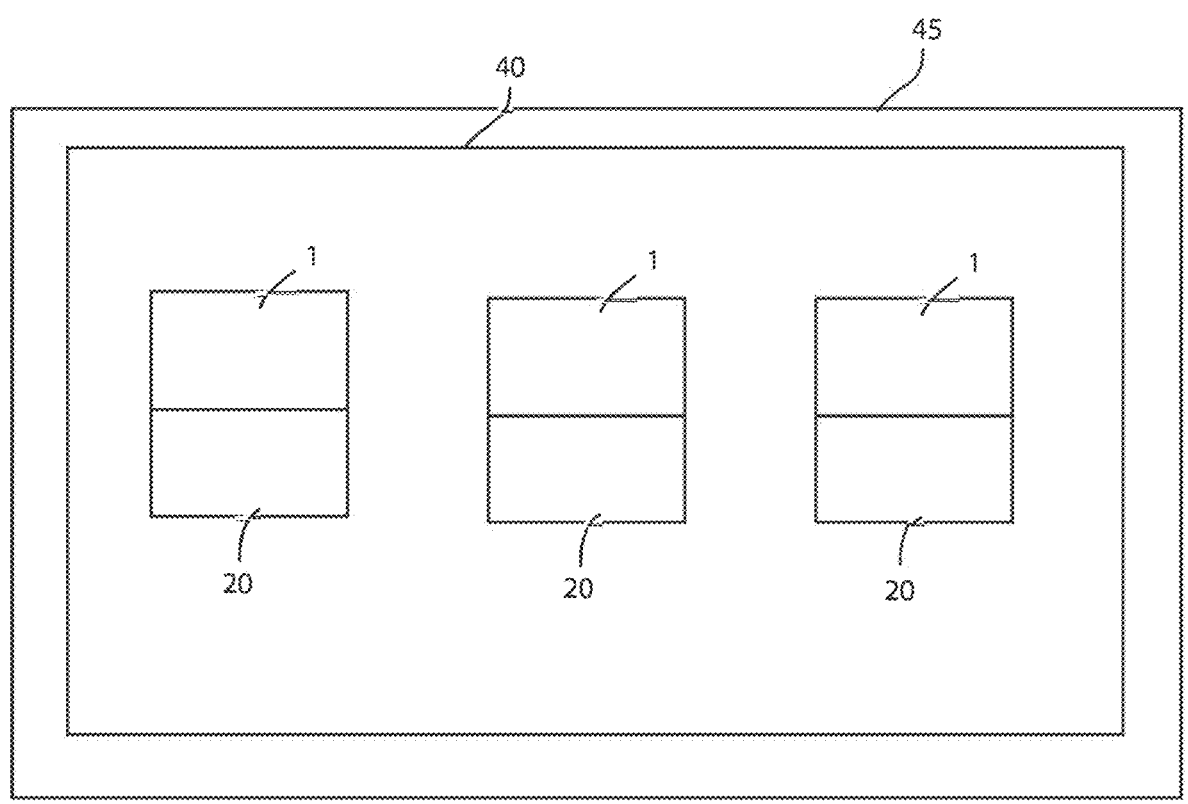
Figure 8:
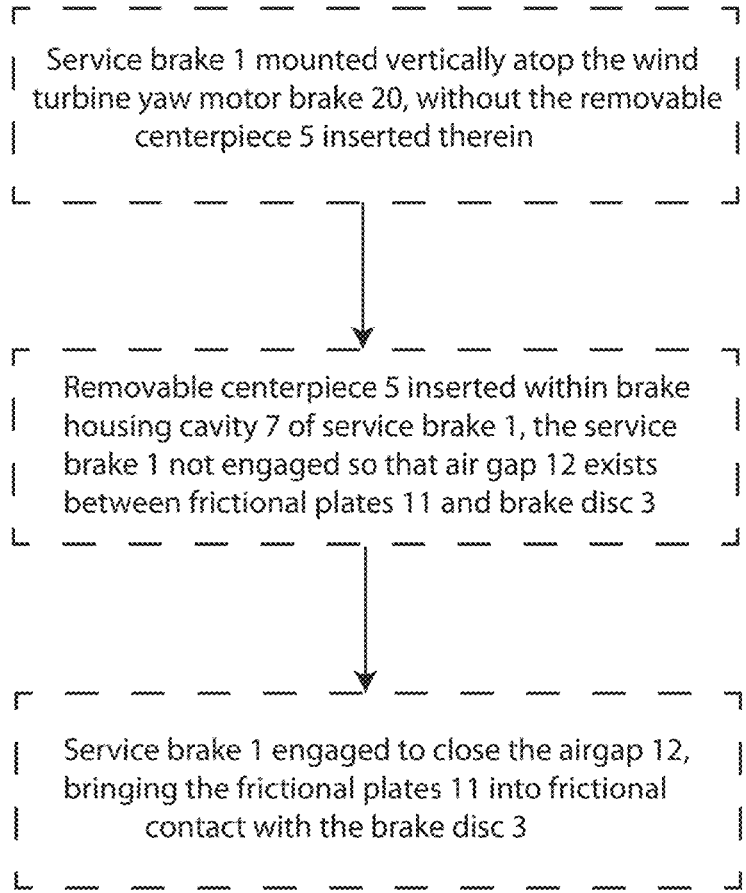

FIG. 7 schematically shows a wind turbine having a yaw drive system with yaw motor brakes and a service brake system mounted atop the yaw motor brakes; and FIG. 8 shows schematically frictional contact between friction plates and the brake disc.

DETAILED DESCRIPTION

Well-known elements are indicated in the further text and have not been described in detail.

Figure 1A:
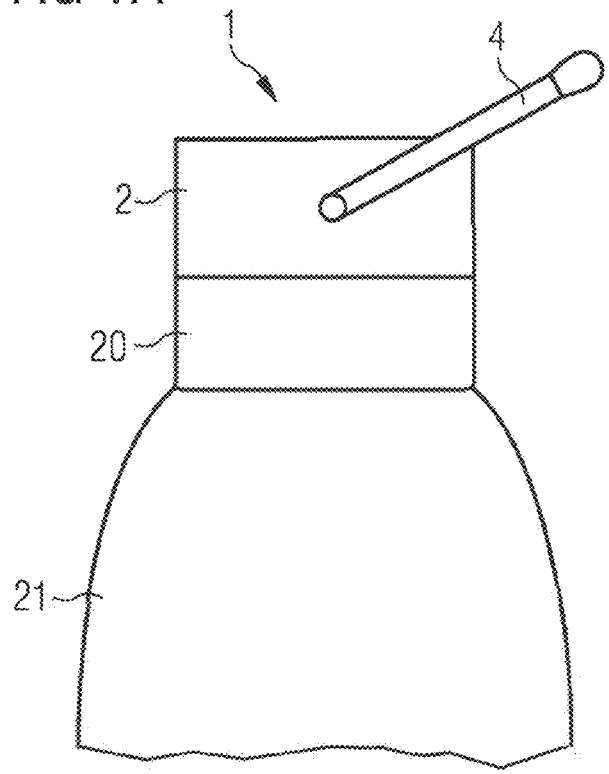
FIG. 1a shows a service brake mounted atop of a wind turbine yaw motor brake, where a lever is in disengaged position.

FIG. 1a shows a service brake 1 that may be mounted atop a wind turbine yaw motor brake 20 via a brake housing 2. The wind turbine yaw motor brake 20 and a wind turbine yaw motor 21 are standard components of a wind turbine yaw drive and will not be discussed in detail herein. The wind turbine yaw drive houses a yaw motor shaft (not shown in FIG. 1) which may be referred to as a shaft 22 to be braked (not shown in FIG. 1). The wind turbine yaw motor brake 20 may become worn-out and it may be desirable to mount the service brake 1 atop the wind turbine yaw motor brake 20 in order to provide additional braking capacity to the wind turbine yaw drive.

The service brake 1 comprises the brake housing 2 to which a lever 4 may be connected. The lever 4 may be used to activate or deactivate the service brake 1. FIG. 1a shows the lever 4 in "disengaged" position. This means that an internal brake disc 3 (not shown in FIG. 1a) is in a free-running state and the service brake 1 is deactivated. The brake housing 2 serves to house internal components of the service brake 1. The brake housing 2 may be cylindrical in shape and might match the wind turbine yaw motor brake 20 which might also be cylindrical with a diameter of the same size as the brake housing 2.

Figure 1B:
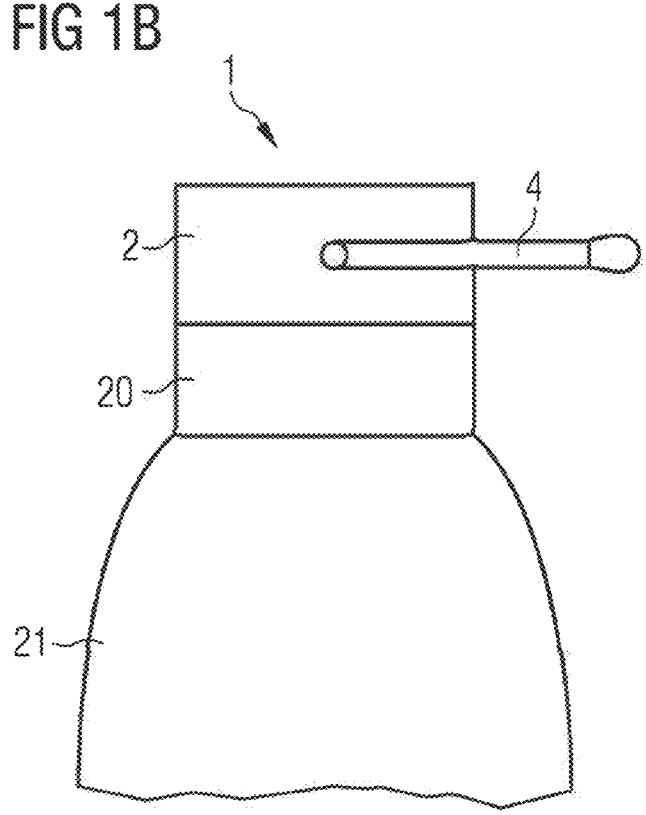
FIG. 1b shows a service brake mounted atop of a wind turbine yaw motor brake, where a lever is in engaged position.

FIG. 1b shows the service brake 1 in which the lever 4 is in "engaged" position. This means that the brake disc 3 (not shown in FIG. 1b) is not in a free-running state anymore, i.e., the service brake 1 is activated.

Once the service brake 1 is mounted, a service technician may insert a centerpiece 5 (not shown in FIG. 1) which couples the shaft 22 to be braked and the service brake 1. By activating the service brake 1, the worn-out wind turbine yaw motor brake 20 is bypassed or its braking capacity supported with the service brake 1. The shaft 22 to be braked is braked by the service brake 1. To activate the service brake 1, the service technician puts the lever 4 in engaged position (FIG. 1*b*). To deactivate the service brake 1, the service technician puts the lever 4 in disengaged position (FIG. 1*a*).

Alternatively, such operation of the lever 4 may also be performed by an electrically driven actuator acting upon the lever 4.

Figure 2:
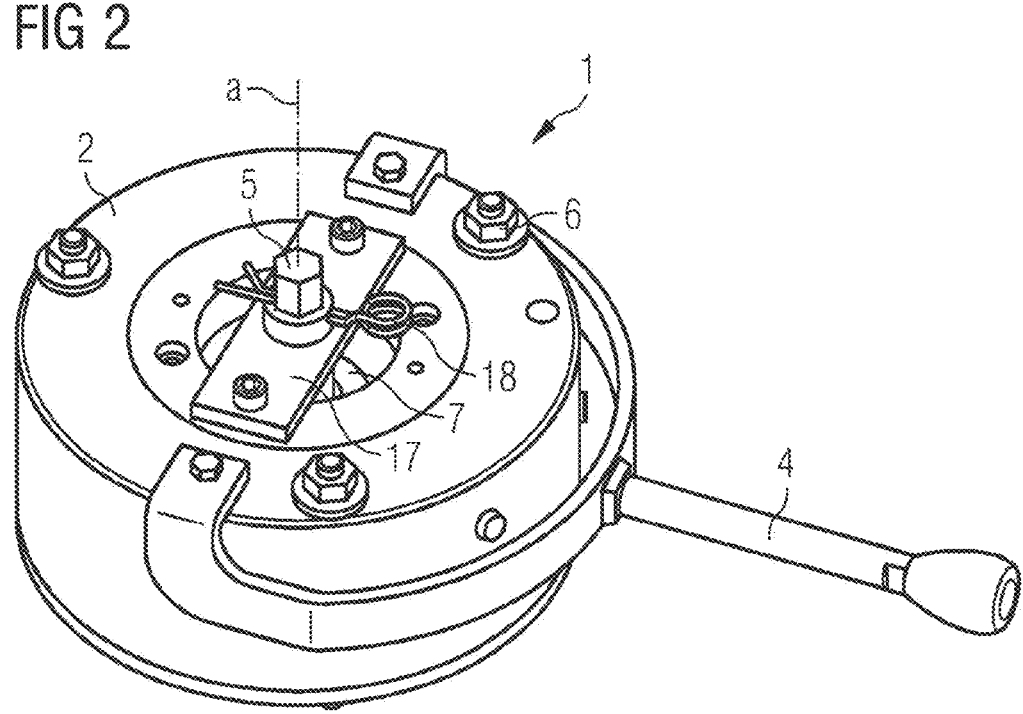
FIG. 2 shows the service brake with its main components.

FIG. 2 shows main components of the service brake 1. The service brake 1 comprises the brake housing 2 to which the lever 4 may be connected. The brake housing 2 may house the brake disc 3 (not shown in FIG. 2).

The brake housing 2 may be cylindrical in shape but other shapes of the brake housing 2 are possible.

The brake housing 2 may be mountable vertically atop the wind turbine yaw motor brake 20 and may comprise a brake housing cavity 7 extending axially, in direction of a central axis (a), through the length of the brake housing 2.

The brake housing 2 may be secured to the wind turbine yaw motor brake 20 with fastening means 6. In an embodiment the fastening means 6 are bolts.

Also seen in FIG. 2 is the removable centerpiece 5 that may be insertable within the brake housing cavity 7, along the central axis (a). The centerpiece 5 may be configured to engage with the brake disc 3 (shown in FIG. 5) and with the shaft 22 to be braked and thereby to transfer braking torque from the brake disc 3 to the shaft 22 to be braked.

Figure 3:
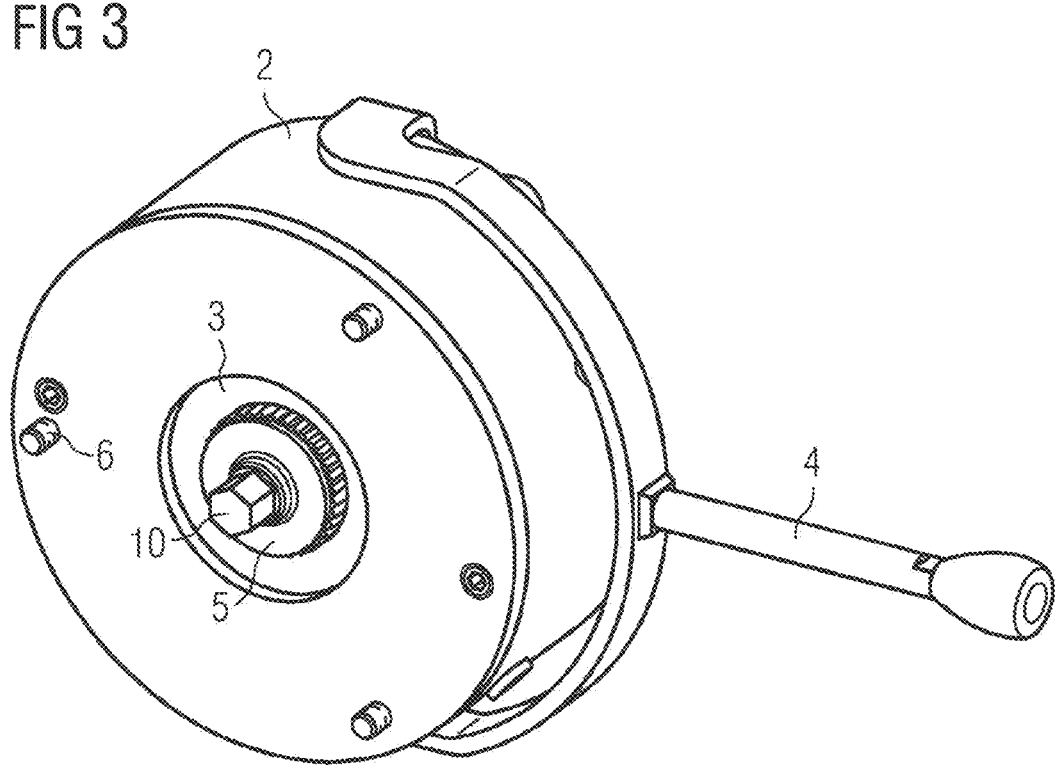
FIG. 3 shows the service brake with its main components from a different angle.

FIG. 3 shows the service brake 1 from another view. The brake housing 2 may house the brake disc 3. The brake disc 3 is rotatable within the brake housing 2 about the central axis (a) in an airgap 12 between at least two friction plates 11 (see FIG. 5). The centerpiece 5, as partially shown in FIG. 3, is configured to engage with the brake disc 3 via a brake disc interface 9) (see FIG. 4). The brake disc 3 may comprise a central opening 13 with a grooved surface 14 into which the brake disc interface 9 of the centerpiece 5 may be received.

Bottom section of the centerpiece 5, as seen on FIG. 3, may be a shaft interface 10, configured to engage with the shaft 22 to be braked. In an embodiment the shaft interface 10 of the centerpiece 5 may have a polygonal cross-sectional profile. In an embodiment, the polygonal cross-sectional profile is a sextant profile as also shown in FIG. 3. The sextant profile of the shaft interface 10 may engage with a corresponding opening of the shaft 22 to be braked.

FIG. 4 shows the removable centerpiece 5. Removable means that it can be manually—or via an actuating tool—inserted into the brake housing cavity 7 and/or manually removed from the brake housing cavity 7. The centerpiece 5 may comprise the already mentioned brake disc interface 9) which may be configured to engage with the brake disc 3 (not shown in FIG. 4). In an embodiment, the brake disc interface 9 is an externally grooved spline shaft 15 as shown in FIG. 4. The centerpiece 5 is insertable into the brake housing cavity 7. A first groove pattern of the spline shaft 15 may correspond to a second groove pattern of the surface 14 of the central opening 13. Once the centerpiece 5 is inserted, the externally grooved spline shaft 15 may engage with the central opening 13 of the brake disc 3. In this way direct coupling of the brake disc 3 and the centerpiece 5 is achieved. This interface defined by mating surfaces of the spline shaft 15 and the surface 14 of the second groove pattern allows the transmission of torque, like breaking torque.

The centerpiece 5 may comprise the shaft interface 10, configured to engage with the shaft 22 to be braked (not shown in FIG. 4). In an embodiment, the shaft interface 10 has a polygonal cross-sectional profile. In an embodiment, the polygonal profile is a sextant profile (shown in FIG. 4 but which can better be seen in FIG. 3). Once the centerpiece 5 is inserted within the brake housing cavity 7, the shaft interface 10 may engage with the shaft 22 to be braked. The shaft interface 10 may protrude into the shaft 22 to be braked via a cavity present in the shaft 22 to be braked. This cavity in the shaft 22 to be braked may be have a substantially same cross-sectional profile as the cross-sectional profile of the shaft interface 10.

The centerpiece 5 may comprise a handle 8. The handle 8 may be used for manual insertion and/or removal of the centerpiece 5 into or from the brake housing cavity 7. The handle 8 may, in an embodiment, comprise a hole 16 for securing the centerpiece 5 on an external support member 17, for example via a pin 18 (see FIG. 2). The external support member 17 may rest on top side of the brake housing 2. The top side of the brake housing 2 is the side facing away from the wind turbine yaw motor 21. The centerpiece 5 may be secured on the external support member 17 in a way that the handle 8 protrudes outwards of the brake housing cavity 7. Term outwards may be understood as, for example, along the central axis (a) in the direction facing away from the wind turbine yaw motor 21. By removing the pin and releasing the handle 8, the centerpiece 5 may be inserted into the brake housing cavity 7.

The centerpiece 5 may be configured to engage with the brake disc 3 via the brake disc interface 9. The centerpiece 5 may also engage with the shaft 22 to be braked via the shaft interface 10. In this way direct coupling between the shaft 22 to be braked and the brake disc 3 may be achieved. If the service brake 1 is deactivated, any rotation of the shaft 22 to be braked is directly translated to the centerpiece 5 and in turn to the free-running brake disc 3. If the service brake 1 is activated, braking torque from the brake disc 3 is transferred to the shaft 22 to be braked.

Figure 5A:
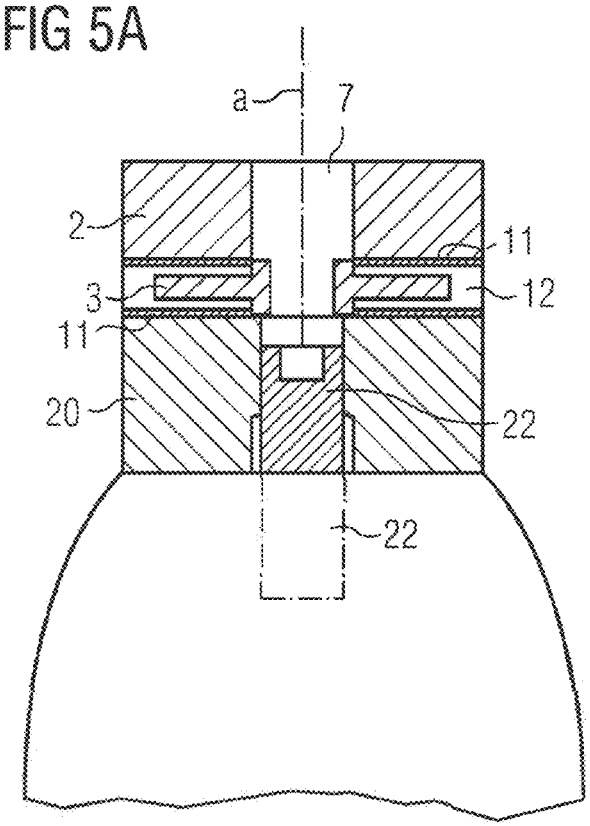
FIG. 5a shows the service brake mounted atop of a wind turbine yaw motor brake, where the removable centerpiece is absent from a brake housing cavity.

FIG. 5*a* shows the service brake 1 mounted vertically atop the wind turbine yaw motor brake 20. The brake housing 2 comprises the brake housing cavity 7 which extends axially through the length of the brake housing 2 and in the direction—i.e., coaxially—of the central axis (a). The service brake 1 comprises the brake disc 3 within the brake housing 2. The brake disc 3 is rotatable about the central axis (a) in a surrounding airgap 12, between at least two friction plates 11. The friction plates 11 may be comprised in the brake housing 2.

The brake disc 3 may be free-running if the service brake is deactivated. The shaft 22 to be braked, as shown in FIG. 5*a*, is decoupled from the brake disc 3 of the service brake 1 because the centerpiece 5 is not inserted in the brake housing cavity 7. This decoupling of the shaft 22 to be braked and the brake disc 3 is a safety feature of the service brake 1. This ensures that mounting of the activated service brake 1 on the yaw motor brake 20, even with the potentially spinning shaft 22 to be braked, does not result in propelling of the service brake 1. There is clearly no torque transfer from the shaft 22 to be braked to the brake disc 3 because of the absence of the centerpiece 5 that would provide the necessary coupling. Only when the centerpiece 5 is inserted into the brake housing cavity 7, by the service technician, does the coupling between the brake disc 3 and the shaft 22 to be braked exist. This safety feature minimizes the risk that the service brake 1 may be propelled within the nacelle because of the potentially spinning shaft 22 to be braked.

Figure 5B:
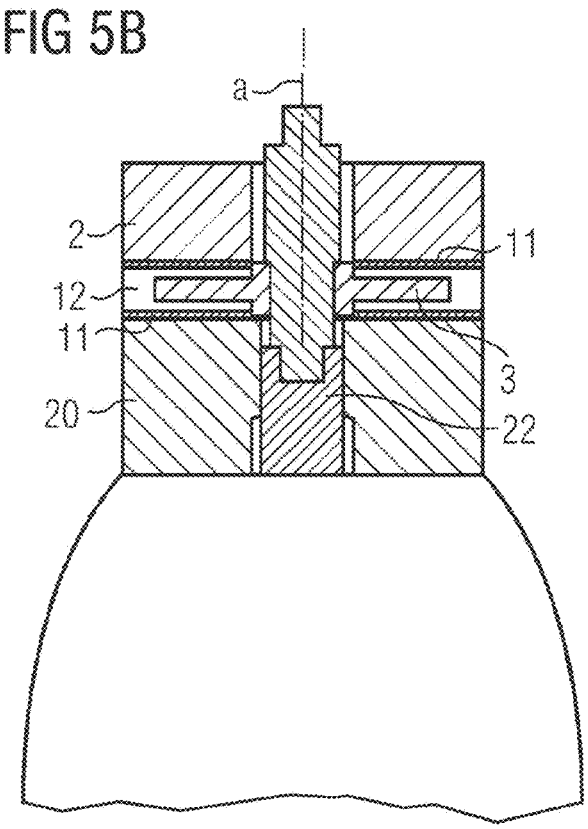
FIG. 5b shows the service brake mounted atop of a wind turbine yaw motor brake, where the removable centerpiece engages with a shaft to be braked.

FIG. 5*b* shows the service brake 1 positioned vertically atop the wind turbine yaw motor brake 20 wherein the centerpiece 5 is inserted within the brake housing cavity 7, engaging both with the brake disc 3 and the shaft 22 to be braked. In this state, the centerpiece 5 may serve as a coupling means between the shaft 22 to be braked and the brake disc 3. In the deactivated state of the service brake 1, any rotation of the shaft 22 to be braked translates directly to rotation of the brake disc 3, via the centerpiece 5. In the activated state of the service brake 1, braking torque of the brake disc 3, via the centerpiece 5, is transferred to braking of the shaft 22 to be braked.

FIG. 6 shows the service brake 1 with the centerpiece 5 inserted in the brake housing cavity 7, engaging both with the brake disc 3 and the shaft 22 to be braked. Furthermore, the lever 4 is shown to be in engaged position. This means that the service brake 1 is activated. The lever 4 may be brought to engaged position by the service technician in order to activate the service brake 1. By placing the lever 4 in engaged position as indicated in FIG. 6, at least a part of the airgap 12 is closed and the friction plates 11 are brought in frictional contact with the brake disc 3, as shown in FIG. 8. The brake disc 3 may now transmit braking torque to the shaft 22 to be braked, via the centerpiece 5. The service brake 1 may in this way bypass the wind turbine yaw motor brake 20. Spring mechanism of the service brake 1 causing this frictional contact is not considered as part of embodiments of the invention and is not discussed in detail. Several state-of-art braking mechanisms are known to person skilled in the conventional art.

In certain conditions of the wind turbine operation, plurality of the wind turbine yaw motor brakes 20, comprised in a wind turbine yaw drive system 40 of a wind turbine 45 (shown in FIG. 7), may become worn-out. This situation may occur for example due to extreme wind load on the wind turbine. In such scenarios there may be a need to lock the complete wind turbine yaw drive system 40 to enable safe repair of a wind turbine component. The wind turbine component may be the worn-out wind turbine yaw motor brake 20 or other component inside the wind turbine.

In embodiments, the method for locking the wind turbine yaw drive system which may comprise a plurality of wind turbine yaw motor brakes 20, may include a step of mounting a plurality of service brakes 1 atop the plurality of wind turbine yaw motor brakes 20. Each of the plurality of service brakes 1 may comprise already described components.

During the mounting process, regardless of state of the plurality of brakes 1 being activated or deactivated, there is no danger of any one service brake 1 of the plurality of service brakes 1 being potentially propelled in case one or more of a plurality of shafts 22 to be braked are spinning. This is because, in the plurality of service brakes 1, there is no torque transfer from the respective brake discs 3 towards the respective shafts 22 to be braked before respective centerpieces 5 are inserted in the respective brake housing cavities 7.

Once the mounting step is completed, the centerpieces 5 of each of the service brakes 1 may be inserted in the respective brake housing cavities 7. Afterwards, the service technician may bring the lever 4 of the service brake 1 of each of the plurality of service brakes 1 in engaged position. The wind turbine yaw drive system may, in this way, be safely locked.

The number of the plurality of mounted service brakes 1 may correspond to the number of wind turbine yaw motor brakes 20 present in the wind turbine. This provides for a safe environment for service technicians performing inspection or service operations on the wind turbine component.

The number of the plurality of mounted service brakes 1 may be less than the number of wind turbine yaw motor brakes 20 present in the wind turbine. This also may provide for a safe environment for service technicians to perform service operation on the wind turbine component. The wind turbine component may be a further wind turbine yaw motor brake 20. The further wind turbine yaw motor brake may be free of the service brake 1, i.e., the service brake 1 may not be installed on the further wind turbine yaw motor brake 20.

For example, the wind turbine yaw drive system may comprise five to twenty, eight to twelve, for example ten wind turbine yaw motor brakes 20 in total and all may become worn-out. The service technician may mount, in an exemplary system of ten wind turbine yaw motor brakes 20, nine service brakes 1 atop nine worn-out wind turbine yaw motor brakes 20 and leave one yaw motor brake 20 without the service brake 1, i.e., the further wind turbine yaw motor brake 20. Then, the service technician may perform service operation on the further wind turbine yaw motor brake 20, onto which the service brake 1 is not mounted. In this way a sufficient braking capacity may be achieved which may safely hold the complete wind turbine yaw drive system braked while allowing for simultaneous service operation. In the mentioned example, it may also be possible to achieve similar results with mounting even fewer service brakes 1.

In an embodiment, for X number of wind turbine yaw motor brakes, X−1 number of service brakes 1 may be applied to enable servicing of the remaining wind turbine yaw motor brakes. More generally, X number of wind turbine yaw motor brakes are present in the wind turbine, X−N number of service brakes 1 may be applied to enable serving of the remaining number of N wind turbine yaw motor brakes.

Performing service operation may comprise inspection, repair procedures or replacement of the wind turbine component with a replacement component.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A service brake for a wind turbine yaw motor brake, the service brake comprising:
   a brake housing mounted vertically on the wind turbine yaw motor brake, the brake housing comprising a brake housing cavity extending axially, in a direction of a central vertical axis, through a length of the brake housing;
   a brake disc within the brake housing, the brake disc being rotatable about the central vertical axis in an airgap;
   at least one friction plate arranged within the brake housing for providing a frictional contact with the brake disc;
   a manipulation device connected to the brake housing, the manipulation device, when engaged, is configured to bring the at least one friction plate in frictional contact with the brake disc; and
   a centerpiece comprising a brake disc interface configured to engage with the brake disc, and a shaft interface configured to engage with a shaft to be braked, configurable to transfer braking torque from the brake disc to the shaft to be braked, wherein the centerpiece is removable and is configured to be insertable within the brake housing cavity and rotatable about the central vertical axis.

2. The service brake according to claim 1, wherein the at least one friction plate of the service brake comprises at least two friction plates for providing a frictional contact with the brake disc, wherein the brake disc is arranged between the at least two friction plates.

3. The service brake according to claim 1, wherein the manipulation device is a lever being connected to the brake housing, wherein the lever, when engaged, is configured to close at least part of the airgap and bring the at least one friction plate in frictional contact with the brake disc.

4. The service brake according to claim 1, wherein the brake housing is cylindrical in shape.

5. The service brake according to claim 1, wherein the brake housing comprises fastening means, for securing the brake housing to the wind turbine yaw motor brake.

6. The service brake according to claim 1, wherein the brake disc comprises a central opening with a grooved surface.

7. The service brake according to claim 6, wherein the brake disc interface is an externally grooved spline shaft.

8. The service brake according to claim 7, wherein a first groove pattern of the externally grooved spline shaft corresponds to a second groove pattern of the surface of the central opening, such that the spline shaft is receivable by the brake disc by engaging the first groove pattern of the spline shaft with the second groove pattern of the surface of the central opening.

9. The service brake according to claim 1, wherein the brake disc interface has a polygonal cross-sectional profile.

10. The service brake according to claim 1, wherein the shaft interface has a polygonal cross-sectional profile.

11. The service brake according to claim 1, wherein the centerpiece comprises a handle for manual insertion of the centerpiece into the brake housing cavity and/or removal of the centerpiece from the brake housing cavity.

12. The service brake according to the previous claim 11, wherein the handle comprises a hole for securing the centerpiece on an external support member.

13. A method for applying the service brake of claim 1 on the wind turbine yaw motor brake, the method comprising:
mounting the service brake atop the wind turbine yaw motor brake;
inserting the centerpiece within the brake housing cavity, the centerpiece engaging with the brake disc by the brake disc interface and engaging with the shaft to be braked with the shaft interface; and
engaging the manipulating device to close at least part of the airgap and bring the at least one friction plate in frictional contact with the brake disc, thereby transferring braking torque from the brake disc to the shaft to be braked.

14. A wind turbine comprising:
a yaw drive system having a yaw motor and the wind turbine yaw motor brake; and
the service brake according to claim 1, wherein the service brake is mounted atop the yaw motor brake.

15. The service brake according to claim 1, wherein the centerpiece is insertable before and after the brake housing is mounted atop the wind turbine yaw motor brake.

16. A method for locking a wind turbine yaw drive system comprising a plurality of wind turbine yaw motor brakes, the method comprising:
mounting a plurality of service brakes, atop the plurality of wind turbine yaw motor brakes,
wherein the plurality of service brakes each include:
a brake housing mountable vertically atop the wind turbine yaw motor brake, the brake housing comprising a brake housing cavity extending axially, in a direction of a central axis, through a length of the brake housing;
a brake disc within the brake housing, the brake disc being rotatable about the central axis in an airgap;
at least one friction plate arranged within the brake housing for providing a frictional contact with the brake disc;
a manipulation device connected to the brake housing, the manipulation device, when engaged, is configured to bring the at least one friction plate in frictional contact with the brake disc; and
a centerpiece comprising a brake disc interface configured to engage with the brake disc, and a shaft interface configured to engage with a shaft to be braked, configurable to transfer braking torque from the brake disc to the shaft to be braked;
inserting the centerpiece of each service brake of the plurality of service brakes in the brake housing cavity of the plurality of service brakes; and
engaging the manipulation device of each service brake of the plurality of service brakes.

17. The method according to claim 16, wherein the mounting comprises mounting a number of the plurality of service brakes equal to the number of the plurality of wind turbine yaw motor brakes.

18. The method according to claim 16, wherein a number of the plurality of service brakes is less than the number of the plurality of wind turbine yaw motor brakes.

19. A method for servicing a wind turbine component, comprising:
locking the wind turbine yaw drive system according to claim 18 using the plurality of service brakes; and
performing a service operation on the wind turbine component, the wind turbine component being a further wind turbine yaw motor brake.

* * * * *